United States Patent [19]

Bohrn et al.

[11] Patent Number: 4,713,084

[45] Date of Patent: Dec. 15, 1987

[54] ALGINATE GEL PARTICLE INKS OR DYE LIQUORS FOR IMPARTING COLOR TO TEXTILES

[75] Inventors: Walter J. Bohrn, Lancaster; Robert D. Lewis, Landisville, both of Pa.; William A. Moggio, Ocean City, N.J.

[73] Assignee: Armstrong World Industries, Inc., Lancaster, Pa.

[21] Appl. No.: 790,822

[22] Filed: Oct. 24, 1985

Related U.S. Application Data

[63] Continuation-in-part of Ser. No. 607,798, May 7, 1984, abandoned.

[51] Int. Cl.$^4$ .......................... C09B 67/00; D06P 5/00
[52] U.S. Cl. ............................................ 8/561; 8/445; 8/620; 8/924; 8/929
[58] Field of Search ............................................ 8/561

[56] References Cited

U.S. PATENT DOCUMENTS

| | | | |
|---|---|---|---|
| 2,808,337 | 10/1957 | Gibsen | 536/3 |
| 3,349,079 | 10/1967 | Freedman | 536/3 |
| 4,222,740 | 9/1980 | Bohrn et al. | 8/448 |
| 4,519,803 | 5/1985 | Clare et al. | 8/445 |

FOREIGN PATENT DOCUMENTS 2148317  5/1985  United Kingdom .

OTHER PUBLICATIONS

McNeely, W. H. and D. J. Pettitt in "Industrial Gums" (Academic Press, 1973), Second Edition, pp. 54–57, 63, 67–75.

Moncrieff, R. W., "Man-Made Fibres", (John Wiley, 1975), pp. 302–306.

*Primary Examiner*—A. Lionel Clingman

[57] ABSTRACT

Gel particle dye liquors for imparting color to textiles are disclosed. The gel particles are prepared by mixing a first composition comprising a alginic acid or an alginic acid derivative with a second composition comprising a mixture of at least one monovalent chloride salt and at least one polyvalent metal salt.

At least one of the compositions contains a dye resulting in the formation of a colored suspension of gel particles in water.

25 Claims, No Drawings ns or dye
liquors for imparting color to
textiles

CROSS-REFERENCE TO RELATED APPLICATION

This application is a continuation in part of U.S. application Ser. No. 607,798, filed May 7, 1984, abandoned, entitled "Gel Particle Inks or Dye Liquors for Imparting Color to Textiles," in the names of Walter J. Bohrn et al.

This invention relates to dye liquors for textiles.

In one of its more specific aspects, this invention pertains to a method for imparting specks of color to textiles through the use of dye liquors comprised of dye containing gel particles.

As used herein, the term "textile" is understood to mean a synthetic, semisynthertic or natural fiber, filament, yarn or fabric which is capable of being colored by the dyes specified herein. If in fabric form, the fabric may be woven, non-woven, or knitted and may be of flat or pile construction.

The textile industry, and more specifially the carpet industry, has done much work pertaining to the development of new methods and equipment for imparting color to carpet. One example of this continuing effort is the recently developed jet printers for carpet.

The present invention facilitates the production of textiles which exhibit speckled color through the use of dye containing gel particles. The speckled color can be imparted to the textiles using conventional textile dyeing and printing equipment.

According to this invention, there is provided gel particles for imparting color to textiles produced by mixing a first composition comprising alginic acid or an alginic acid derivative with a second composition comprising, as a gel agent for the first composition, a mixture of at least one polyvalent metal salt and at least one monovalent chloride salt. In addition, at least one of the compositions also contains a dye. The first composition and the second composition will chemically react to form gel particles in an aqueous suspension (which phrase is alternatively referred to herein as a "gel particles-in-water suspension" or a "suspension of gel particles in water"), the gel particles being water insoluble and thermally irreversible, that is, they cannot be liquified by heat alone, within a temperature range of from about ambient temperature up to at least 300° F.

Also according to this invention, there is provided a method for imparting color to textiles comprising:

(a) applying, to a textile surface, a textile dye liquor comprised of gel particles produced by mixing a first composition comprising alginic acid or an alginic acid derivative with a second composition comprising a monovalent chloride salt/polyvalent metal salt gel agent for the first composition, at least one of the compositions also containing a dye whereby the first composition and the second composition chemically react forming a suspension of gel particles in water, the gel particles being water insoluble and thermally irreversible within a temperature range of from about ambient temperature up to at least 300° F. and (b) heat treating the textile to transfer and fix at least some of the dye contained in the gel particles on to the textile.

If desired, the textile may be washed to remove any alginate and other undesirable residues therefrom.

As used herein, the aqueous composition containing alginic acid or an alginic acid derivative is referred to as the "first composition," and the aqueous composition which serves, via a gel agent, to gel the first composition is referred to as the "second composition."

As used herein, the term "dye" is understood to mean and include acid dyes, algin compatible cationic dyes, algin incompatible cationic dyes, direct dyes and disperse dyes. Acid dyes are typically employed to impart color to nylon textiles. Cationic dyes are typically employed to impart color to acrylic textiles. Disperse dyes are typically employed to impart color to polyester as well as nylon textiles.

As used herein, the term "ambient temperature" is understood to mean room temperature that is an interior temperature from about 65° to about 77° F.

The term "heat treating", as used herein, refers to subjecting the textile material, which contains the gel particles of the invention on the surface thereof, to temperatures above about 200° F. according to any of the conventional processes that are used in the textile industry to fix dyes on to textile materials. The preferred methods of heat treating are with steam or dry heat.

In one embodiment of this invention, both the first composition and the second composition contain at least one dye.

In another embodiment, the textile may be conventionally background dyed prior to or after step (a) as set forth above.

In another embodiment of this invention, at least two different color suspensions of gel particles in water are separately prepared and blended together forming a multi-color gel particle dye liquor of this invention. If desired, some gel particles in the blend may be colorless in which case, for example, they could serve as a resist to subsequent background dyeing.

In the practice of this invention, alginic acid or any suitable derivative of alginic acid can be employed in the first composition. term "alginic acid derivative" as used herein refer to such derivatives which are capable of being gelled and most particularly to sodium, ammonium and potassium alginate salts which are capable of being gelled.

Suitable for use as alginic acid derivatives are the refined sodium alginates designed "KELGIN," the industrial sodium alginates designated "KELTEX," the specially clarified low-calcium sodium alginates designated "KELCO," the refined ammonium and refined potassium alginates designated "SUPERLOID" and "KELMAR," respectively, all commercially available from Kelco Division of Merck & Co., Inc.

Particularly suitable alginic acid derivatives are the refined sodium alginates designated "KELGIN HV," "KELGIN MV," "KELGIN F," "KELGIN LV," KELGIN XL, "KELGIN RL," and "KELVIS."

The first composition will contain from about 0.5% to about 5% by weight of alginic acid or alginic acid derivative, preferably from about 1% to about 2.5% by weight. In addition, the first composition can optionally also contain preservatives designed to forestall the breaking down of the alginic acid derivatives due to bacterial action. There are numerous commercially available preservatives that can be used for this purpose, and the choice of the ultimate preservative to be utilized will depend on the individual practitioner of the invention. For example, one suitable preservative is GIV GARD DXN, which is a trademark of the Givavdan Corporation for 6-acetoxy-2,4-dimethyl-m-dioxane. As stated above, the use of such preservatives is optional. However, when they are used it is generally in amounts ranging from about 0.05 wt. % to about 0.3 wt. % based on the total weight of the first composition. The balance of the composition will generally be soft water free of polyvalent cations. However, as stated above, the first composition can also include art recognized amounts of algin compatible dyes, thickening agents, dye modifying agents, and the like.

The resulting first composition will typically have a viscosity within the range of from about 10 to about 500 cp as measured on a Brookfield Viscometer, Model RVF (#1 spindle, 20 rpm).

The second composition will contain a "gel agent" understood to mean a material which serves to cross link and thus gel algin polymers, and specifically the alginic acid or alginic acid derivative which is present in the first composition. In this regard, it has been unexpectedly discovered that a gel agent which comprises a mixture of a polyvalent metal salt and a monovalent chloride salt will produce a dye particle with the most desirable balance of properties. For example, particles so produced are more easily broken down (with the subsequent release of the dye) in the dyeing process and yet unexpectedly have exhibited a high degree of mechanical integrity and can thus be utilized in a variety of high stress applications that particles which are made without using the $NaCl/CaCl_2$ gelling agent would not tolerate. Particles made according to the present invention can, for example, be subjected to shear sources and pumped or otherwise circulated in a dyeing apparatus manifold. The particles would also be better adaptable to mechanical techniques for achieving uniform particle size distribution. For example, large diameter particles made via the process of the present invention can be forced through a screen of a desired mesh without the particles being ruptured with the resulting premature release of the dyes contained therein.

Examples of suitable monovalent chloride salts for use in the gel agent are potassium chloride and sodium chloride, the latter being the monovalent chloride salt of choice. The term "polyvalent metal salt" as used in the specification and claims refers to those polyvalent metal salts, with the exception of magnesium salts, which are soluble in water. The preferred polyvalent metal salts which are employed in this invention are polyvalent metal chloride or sulfate salts. The most preferred polyvalent metal salts are calcium chloride and aluminum sulfate. When utilizing sodium chloride as the monovalent chloride salt and calcium chloride as the polyvalent metal salt, the gel agent will contain from about 2 to about 20 weight parts of sodium chloride to one weight part calcium chloride and, most preferably, from about 5 to about 15 weight parts of sodium chloride to one weight part calcium chloride. In addition to the monovalent chloride salt/polyvalent metal salt gel agent, the gelling composition can contain cationic dyes which will gel and are incompatible with algins, for example, Basic Yellow 53 and 58, Basic Red 22 and 51, Basic Blue 87 and Basic Orange 31.

The amount of gel agent employed in the second composition must be sufficient to gel the first composition. The amount of gel agent needed is dependent on the weight of algin in the first composition and can be easily calculated based on the weight of the polyvalent metal salt. One method of ensuring sufficient gel agent is to employ an excess amount of gel agent. Employing the gel agent in an amount of at least 1 percent by weight of the second composition will typically provide an excess amount of cations sufficient to ensure gelling. For example, if the polyvalent metal salt utilized is calcium chloride, it is known in the art that stoichometrically 7.2% calcium is required based on the weight of sodium alginate for complete substitution but that gels are formed with about 30% of this amount. Further information regarding gel agents and the amounts needed to form algin gels is set forth in the book entitled "Kelco Algin," 2d ed. available from the Kelco Division of Merck Co., Inc. herein incorporated by reference.

The gel particles of the present invention are, for all intents and purposes, thermally irreversible at temperatures utilized in conventional processes to fix dyes on to textile materials. However, there will be a certain amount of migration of the dye from the particles on to the fabric or textile during heat treating. However, if the heat treating period will last a comparatively short period of time, e.g. from 30 seconds to one minute or, alternatively, if the practitioner of the invention would desire an enhanced depth of color on the textile material or would desire to achieve the fullest utilization of the dye material it would thereupon be advantageous to utilize a chemical "gel breakdown" agent which can either be applied to the textile in an aqueous solution either before or after the application of the dye particles to the textile but always before the heat treating step. Alternatively, the gel breakdown agent can be incorporated in the dye particle itself. The gel breakdown agent would promote the liquidification of the gel during the heat treating step with the resultant complete release of the dye on to the fabric. Any material which serves to facilitate the breakdown of the gel upon heating at temperatures generally utilized to set dyes on fabrics can be employed as suitable gel breakdown agents. For example, if the gel breakdown agent is to be applied directly to the textile, alkaline salts or bases of monovalent cations such as sodium, potassium and lithium, such as, for example, soda ash (sodium carbonate) and sodium hydroxide; ammonium compounds such as, for example, ammonium hydroxide and ammonium carbonate; and/or polyvalent metal chelating materials such as ethylenediamine tetracetic acid, sodium citrate, and ammonium citrate are suitable gel breakdown agents. Ammonium carbonate, ammonium bicarbonate, ammonium citrate and sodium bicarbonate are examples of suitable gel breakdown agents when said agents are incorporated in the gel particles.

The gelling composition can also contain art recognized amounts of conventional dyes, thickening agents, dye modification agents, and the like.

If the first and second compositions are simpl combined without being suitably mixed, a large non-homogenous gelled material, which cannot be utilized for the method of the present invention, will form upon the reaction of the first and second compositions. A moderately rigorous mixing procedure will serve to form, simultaneously with the reaction of the first and second compositions, smaller homogenous gelled particulate material, which are herein referred to as "gel particles". Accordingly, any suitable mixing procedure can be employed to produce the gel particles of this invention. For example, the gelling composition can be introduced into the gelable composition with agitation or vice versa, or the compositions can be introduced simultaneously into a static mixer. The resulting gel particles produced by these methods are not uniform in shape and typically possess diameters in their maximum dimension within the range of from about 1/32 to about ½ inch. The size and size distribution of the gel particles can be further controlled, if desired, by such techniques as mechanical size reduction which are known in the art.

The following method was employed to form the gel particles used in the examples of this invention.

A first composition containing a dye was placed in a mixing vessel with low speed mixing. The mixing speed was gradually increased as the viscosity of the vessel contents increased. The second composition was slowly poured into the vortex formed in the first composition, resulting in the formation of a gel particle-in-water suspension. Using this method, the size of gel particles formed can be somewhat controlled by varying the rate of addition of the compositions and/or the mixing speed.

The gel particles produced according to this invention are in the form of a gel particle-in-water suspension. This gel particle-in-water suspension can be used as a textile dye liquor in conventional printing or dyeing applications. Typically, however, in order to facilitate printing or dyeing, it is desirable to incorporate a conventional thickening agent into the suspension in an amount sufficient to meet the viscosity requirements of the particular printing applicators (e.g., flat or rotary screen printers, stencil printers, jet printers, etc.) or dye applicators (e.g. Tak dye unit, Kuster dye unit, beck dye unit, etc.) to be used to apply the gel particle-in-water suspension to a textile.

Alternatively, the gel particles can be filtered from the water and incorporated into another liquid forming a gel particle-in-liquid suspension suitable for use as a textile dye liquor.

In yet another alternative the gel particles can be filtered from the water and the gel particles applied to a textile surface using, for example, a doctor blade, hand application, or other suitable means of application.

EXAMPLE I

The following is an example of preparing the particles of the present invention using a continuous, in-line mixer method:

In a mixing vessel containing about 92.4 liters of water were added about 237.5 grams of calcium chloride and about 2,375 grams of sodium chloride with stirring. The resulting mixture was recovered as a first composition which contained about 97.25 weight percent soft water, 2.5 weight percent NaCl and 0.25 weight percent $CaCl_2$.

In a second mixing vessel there were mixed 950 liters of refined sodium alginate (Kelgin MV), 190 grams of 6-acetoxy-2,4-dimethyl-m-dioxane and about 92.15 liters soft water to form a colorless second composition that had a Brookfield viscosity of 390–400 cps.

Twelve liters of this latter composition was placed in each of six separate containers equipped with homogenizer mixers. With the homogenizers set for medium/high agitation, disperse dye powders were slowly added to each container as per the formulations listed below. The contents of the containers were each mixed for about 5 minutes to ensure the homogenous dispersement of the dye powders.

| Container No. | Particle Color | Resolin Yellow PGG (gms) | Eastman Nylon Red 2 R 150% (gms) | Resolin Blue FBL (gms) |
| --- | --- | --- | --- | --- |
| 1 | Gold | 128.0 | 3.0 | 0.96 |
| 2 | Rust | 12.0 | 25.2 | — |
| 3 | Brown | 47.5 | 32.0 | 14.4 |
| 4 | Black | 31.2 | 24.0 | 7.2 |
| 5 | Green | 43.2 | 5.3 | 4.3 |
| 6 | Blue | 12.0 | 15.6 | 7.2 |

To prepare the particles of the present invention two inlet feed lines, one for transporting the dye containing first composition and one for transporting the second composition, were arranged to bring the two compositions into intimate contact within a common pipe-type mixing chamber. Using a standard moyno-type metering pumps, the delivery of both the first composition and the second composition were calibrated at 3 gals. per minute into the chamber. In separate runs, each of the different colored first compositions and the second composition was fed into the mixing chamber whereupon coming in contact they gelled. The thus formed gelatinous masses were individually collected in a clean, plastic lined containers and were each then poured through a comomil refiner unit which was equipped with a ⅛" opening screen to thereby form the dye particles of the present invention.

EXAMPLE II

Into a first mixing vessel containing about 29.4 liters of soft water was introduced about 300 grams of refined sodium alginate (Kelgin MV). The alginate was added directly into the vortex created by mixing with a turbine shaped stirrer.

Stirring was continued for about one half hour and a smooth solution having a viscosity of about 450 cp resulted (Brookfield RVF Viscometer; #1 spindle, 20 rpm.)

Into the contents of the first mixing vessel were added 36 grams of Disperse Blue 56 dye; 80 grams of Disperse Red 309 dye and 118.8 grams of Disperse Yellow 74 dye. The contents of the mixing vessel, a first composition of this invention, took on a dark brown color.

Into a second mixing vessel containing about 26.7 liters of water were added about 300 grams of calcium chloride and 3000 grams of sodium chloride with stirring. The resulting mixture was recovered as the second composition.

To produce gel particles, the first composition and second composition were combined as follows.

The first composition was placed in a mixing vessel and stirred with a hand held air stirrer equipped with a turbine blade at a stir rate, sufficient to create a vortex, about 90 rpm.

The total amount of the second composition was then introduced into the vortex over a period of about one minute forming a gel particle-inwater suspension.

Stirring was continued to break down the larger gel particles that formed, that is, particles having diameters in their maximum dimension greater than ½ inch.

The resulting contents of the mixing vessel were recovered as a gel particle-in-water dye liquor. The gel particles were observed to be dark brown in color and to be irregularly shaped, having diameters in their maximum dimension within the range of from about 1/32 to about ½ inch.

EXAMPLE III

This example demonstrates the preparation of three multi-color gel particle-in-water suspensions of this invention.

Using substantially the method of Example II, six different color gel particle-in-water suspensions were separately prepared by introducing into 30 liters of each first composition set forth below, 30 liters of a second composition having the composition described in Example II.

| First Composition (Amounts are in parts per 100 parts by weight) | | | | | | |
|---|---|---|---|---|---|---|
| Ingredient | Black | Beige | Nutmeg | Brown | Orange | Gold |
| Disperse Yellow 74 | 0.22 | 0.025 | 0.195 | 0.396 | 0.716 | 0.80 |
| Disperse Red 309 | 0.106 | 0.013 | 0.069 | 0.267 | 0.065 | 0.025 |
| Disperse Blue 56 | 0.62 | 0.028 | 0.022 | 0.120 | 0 | 0.008 |
| Kelgin MV | 1.0 | 1.0 | 1.0 | 1.0 | 1.0 | 1.0 |
| Soft Water | 98.05 | 98.93 | 98.72 | 98.22 | 98.22 | 98.17 |

Three multi-color gel particle-in-water suspensions, A, B, and C were prepared as follows using the above prepared particles.

| Multi-Color Gel Particle-In-Water Suspension (Amounts are in parts per 100 parts by weight) | | | |
|---|---|---|---|
| Ingredient | A | B | C |
| Black Gel Particle-in-water Suspension | 3.2 | 0 | 8 |
| Beige Gel Particle-in-water Suspension | 6.4 | 0 | 16 |
| Nutmeg Gel Particle-in-water Suspension | 6.4 | 0 | 16 |
| Brown Gel Particle-in-water Suspension | 0 | 6.4 | 8 |
| Orange Gel Particle-in-water Suspension | 0 | 12.8 | 16 |
| Gold Gel Particle-in-water Suspension | 0 | 12.8 | 16 |
| Thickening agent[1] | 0.68 | 0.73 | 0.70 |
| Water | 83.32 | 67.27 | 19.3 |

[1]Modified guar gum (Chemloid 2235NI, Chemloid Industries)

Suspension A was observed to contain black, beige and nutmeg colored gel particles and was tested and found to have a viscosity of 70 cp (Brookfield RVF viscometer, #1 spindle, 20 rpm).

Suspension B was observed to contain brown, orange and gold colored gel particles and ws tested and found to have a viscosity of 151 cp. (Brookfield RVF viscometer, #1 spindle, 20 rpm.)

Suspension C was observed to contain black, beige, nutmeg, brown, orange and gold colored gel particles and was tested and found to have a viscosity of 474 cp (Brookfield RVF viscometer, #2 spinkle, 20 rpm.)

EXAMPLE IV

This example demonstrates the preparation of space dyed yarn using as a dye liquor, multi-color gel particle-in-water suspension C of Example III.

On a conventional warp beam space dyeing apparatus was creeled 400 ends of Antron 497A (1820/2; 1.75Z×1.75S) yarn.

Using a conventional kiss roll applicator, the yarns were wetted (about 75 percent by weight pickup) with a pre-wet composition prepared by mixing 8 percent by weight benzyl alcohol, 12 percent by weight propylene glycol and 80 percent by weight soft water.

The pre-wetted yarns were passed through a dip tank containing as a dye liquor, multi-color gel particle-in-water suspension C of Example III.

As the yarns passed through the dye liquor in the dip tank, the dye liquor was agitated to distribute the gel particles and the yarns were randomly coated with the multi-color gel particles. The weight percent pickup of the dye liquor was 350–400 based on the dry weight of the yarn.

The gel particle coated yarns were then overall sprayed with a beige background dye liquor containing 2 percent by weight sodium carbonate, a gel-softening aid to reduce the amount of steaming time needed to transfer the dye in the particles to the yarn.

The yarns were then steamed at 230° F. in a four pass steamer at a line speed of about 9 yards/minute which provided a steam time of about 80 seconds. In the steamer, the dye contained in the gel particles migrated from the particles onto the yarns.

The resulting yarns were then sequentially water washed using spray nozzles to remove the undissolved gel particles, squeezed to remove water, and dried on a series of drying cans.

The resulting space dyed yarns were wound onto packages and observed to possess randomly spaced, small specks of color.

The space dyed yarns were tufted into carpet, which carpet exhibited a heather type visual effect. The typical chevron type streaks observed in prior art space dyes yarns were not present.

EXAMPLE V

This example demonstrates the dyeing of carpet using a dye liquor, multi-color gel particle-in-water suspension A of Example III.

A 5/32 inch gauge, nylon loop tufted carpet having a weight of 28 ounces/yd.$^2$ was pad squeezed with water to a pickup of about 100 percent by weight of the dry carpet.

The carpet was then passed under a first flood applicator where a dye liquor, the multi-color gel particle-in-water suspension A of Example III, was applied to a pickup of about 400 percent by weight of the dry carpet.

The carpet was then passed under a second flood applicator where a beige background dye liquor containing about 2 percent be weight sodium carbonate was applied to a pickup of about 350 percent by weight of the dry carpet.

The carpet was steamed for about 14 minutes in a horizontal steamer, water washed and then dried in a hot air oven.

The resulting dyed carpet was observed to posses randomly oriented specks of color on a light beige background.

EXAMPLE VI

This example demonstrates the screen printing of carpet using as a printing ink, multi-color, gel particle-in-water suspension B of Example III.

A sample of greige goods carpet (747 nylon, level loop, 5/64 gauge, 13.25 oz/yd.$^2$) was printed, using a double roller squeegee, through a nickel screen having a swirl pattern comprised of various mesh size openings. The printing ink used was multi-color gel particle-in-water suspension B of Example III, adjusted to a viscosity of 750 cp (Brookfield RVF, #1 spindle, 20 rpm)

using a modified guar gum stock solution (3.5% by weight Chemloid 2235 NI in water).

The resulting screen printed carpet was observed to possess a speckled multi-color visual effect. The speckled effect was more pronounced in the areas of the carpet corresponding to the larger mesh opening of the screen (5-10 mesh).

EXAMPLE VII

Utilizing the process of Example II, in a mixing vessel a first composition was formed containing 1.3 wt. % of sodium alginate (Kelvin MV), 2 wt. % ammonium carbonate and 96.7 wt. % soft water was then introduced into a second mixing vessel that contained 1 wt. % $CaCl_2$, 10 wt. % NaCl and 89 wt. % water to thereby form a gel particle in water solution.

The particles were placed on a watch glass and placed in a steam chamber. Within 30 seconds the particles began to be broken down (i.e. liquidified). Particles formed in a similar manner but without the incorporation of ammonium carbonate in the first composition showed no sign of breakdown in a similar time period.

It will be evident from the foregoing that various modifications can be made to this invention. Such, however, are considered to be within the scope of this invention.

What is claimed is:

1. Gel particles for imparting color to textiles produced by mixing a first composition comprising alginic acid or an alginic acid derivative with a second composition comprising a gel agent for the first composition, at least one of said compositions also containing a dye, whereby the alginic acid or alginic acid derivative of said first composition and the gel agent of said second composition react forming a suspension of gel particles in water, said gel particles comprising said dye, having a particle size dimension of from about 1/32 to about ½ inch and being water insoluble and non-liquifiable within a temperature range of from about ambient temperature up to at least 300° F. and wherein said gel agent is comprised of a mixture of a monovalent chloride salt and a polyvalent metal salt other than magnesium.

2. The gel particles of claim 1 wherein the monovalent chloride slat is sodium chloride.

3. The gel particles of claim 2 wherein the polyvalent metal salt is aluminum sulfate.

4. The gel particles of claim 2 wherein the polyvalent metal salt is calcium chloride.

5. The gel particles of claim 4 in which, in the gel agent, the sodium chloride is present in amounts varying from about 2 to about 20 weight parts for every weight part of calcium chloride.

6. The gel particles of claim 1 in which said first composition contains sodium alginate.

7. A method for imparting color to textiles comprising:
(a) applying to a textile surface a dyeing composition comprising gel particles produced by mixing a first composition comprising alginic acid or an alginic acid derivative with a second composition comprising a gel agent for the first composition, at least one of said compostions also containing a dye, whereby the alginic acid or alginic acid derivative of said first composition and the gel agent of said second composition chemically react forming a suspension of gel particles in water, said gel particles comprising said dye, having a particle size dimension of from about 1/32 to about ½ inch and being water insoluble and non-liquifiable within a temperature range of from about ambient temperature up to at least 300° F. and wherein said gel agent is comprised of a mixture of a monovalent chloride salt and a polyvalent metal salt other than magnesium; and
(b) heat treating the textile to fix at least some of the dye contained in the gel particles on to the textile.

8. The method of claim 7 wherein the monovalent chloride salt is sodium chloride.

9. The method of claim 8 wherein the polyvalent metal salt is aluminum sulfate.

10. The method of claim 8 wherein the polvalent metal salt is calcium chloride.

11. The method of claim 7 in which said first composition contains sodium alginate.

12. The method of claim 7 in which said textile is background dyed prior to or after step (a).

13. The method of claim 7 in which said dyeing composition comprises a blend of at least two separaately prepared different color gel particles.

14. The method of claim 7 in which a chemical gel breakdown agent to promote liquification of the gel during heating is applied to the fabric prior to step (a).

15. The method of claim 14 wherein the chemical gel breakdown agent is an alkaline salt or base of a monovalent cation.

16. The method of claim 14 wherein the chemical gel breakdown agent is selected from the group of sodium carbonate, sodium hydroxide, ammonium carbonate and ammonium hydroxide.

17. The method of claim 14 wherein the chemical gel breakdown agent is a material capable of chelating a polyvalent metal.

18. The method of claim 17 wherein the chemical gel breakdown agent is selected from ammonium citrate, sodium citrate and ethylenediamine tetracetic acid.

19. The method of claim 8 in which, following the application of the dyeing composition to the textile surface but before the textile is heated, a chemical gel breakdown agent is applied to the fabric to liquify the gel during heat treating.

20. The method of claim 19 wherein the chemical gel breakdown agent is an alkaline salt or base of a monovalent cation.

21. The method of claim 19 wherein the chemical gel breakdown agent is selected from the group of sodium carbonate, sodium hydroxide, ammonium carbonate and ammonium hydroxide.

22. The method of claim 19 wherein the chemical gel breakdown agent is a material capable of chelating a polyvalent metal.

23. The method of claim 22 wherein the chemical gel breakdown agent is selected from ammonium citrate, sodium citrate and ethylenediamine tetracetic acid.

24. The method of claim 7 in which the first composition further contains a chemical gel breakdown agent to liquify the gel during heat treating.

25. The method of claim 24 wherein the chemical gel breakdown agent is selected from ammonium carbonate, ammonium citrate, sodium bicarbonate and ammonium bicarbonate.

* * * * *

UNITED STATES PATENT AND TRADEMARK OFFICE
CERTIFICATE OF CORRECTION

PATENT NO. : 4,713,084

DATED : December 15, 1987

INVENTOR(S) : Walter J. Bohrn et al

It is certified that error appears in the above-identified patent and that said Letters Patent are hereby corrected as shown below:

In the Specification, in column 1, line 20, the word "semisynthertic" should read --semisynthetic--; in column 2, line 42, before the word "term", insert --The--; in column 2, line 43, the word "refer" should read --refers--; in column 4, line 14, after the name "Merck", insert --&--; in column 4, line 56, the word "simpl" should read --simply--; in column 6, line 61, the word "particle-inwater" should read --particle-in-water--.

In the Claims, in claim 1, line 29, after the word "mixing", insert --with agitation--. In claim 2, line 45, the word "slat" should read --salt--. In claim 7, line 59, after the word "mixing", insert --with agitation--; same claim, line 63, the word "compostions" should read --compositions--. In claim 13, line 23, the word "separaately" should read --separately--.

Signed and Sealed this

Thirty-first Day of May, 1988

Attest:

DONALD J. QUIGG

Attesting Officer

Commissioner of Patents and Trademarks